(12) United States Patent
McNamara (10) Patent No.: US 7,526,038 B2
(45) Date of Patent: Apr. 28, 2009

(54) COMMUNICATIONS SYSTEM, METHOD AND DEVICE

(75) Inventor: Darren Phillip McNamara, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 722 days.

(21) Appl. No.: 11/034,831

(22) Filed: Jan. 14, 2005

(65) Prior Publication Data

US 2005/0190849 A1    Sep. 1, 2005

(30) Foreign Application Priority Data

Feb. 27, 2004    (GB) .................................. 0404450.9

(51) Int. Cl.
*H04B 7/02*     (2006.01)
*H04L 1/02*     (2006.01)

(52) U.S. Cl. ........................ 375/267; 375/347; 455/101; 455/344; 370/487

(58) Field of Classification Search ................ 375/259, 375/264, 267, 295, 299, 316, 344, 347, 349; 370/203, 208, 487; 455/73, 550.1, 561, 562.1, 455/101, 344
See application file for complete search history.

(56) References Cited

U.S. PATENT DOCUMENTS

| | | | |
|---|---|---|---|
| 7,248,841 B2* | 7/2007 | Agee et al. .................. 455/101 |
| 2003/0083016 A1* | 5/2003 | Evans et al. ................. 455/67.1 |
| 2004/0052315 A1* | 3/2004 | Thielecke et al. ........... 375/299 |
| 2006/0114813 A1* | 6/2006 | Seki et al. ................... 370/208 |

FOREIGN PATENT DOCUMENTS

| | | |
|---|---|---|
| EP | 0 735 701 A2 | 10/1996 |
| EP | 0 740 430 A2 | 10/1996 |
| EP | 1 294 120 A1 | 3/2003 |
| JP | 8-307330 | 11/1996 |
| JP | 2004-40232 | 2/2004 |
| WO | WO 03/034614 A1 | 4/2003 |
| WO | WO 2004/028063 A1 | 4/2004 |

\* cited by examiner

*Primary Examiner*—Ted Wang
(74) *Attorney, Agent, or Firm*—Oblon, Spivak, McClelland, Maier & Neustadt, P.C.

(57) ABSTRACT

A communications system including a transmitting device having plural transmit antennas and a receiving device having plural receive antennas. When it is determined that an error has occurred in a first data transmission attempt in which data signals are transmitted from a first selection of transmit antennas for receipt at a second selection of receive antennas, a second data transmission attempt is performed in which the data signals are re-transmitted from a third selection of transmit antennas for receipt at a fourth selection of receive antennas. Before the second transmission attempt, a reconfiguration operation is performed to ensure the channel response between the transmit and receive antennas selected for the first transmission attempt is different to the channel response between the transmit and receive antennas selected for the second transmission attempt. Data is then recovered at the receiving device using information from the first and second transmission attempts.

42 Claims, 7 Drawing Sheets

COMMUNICATIONS SYSTEM, METHOD AND DEVICE

FIELD OF THE INVENTION

This invention relates to a communications method for use in a communications system in which a transmitting device has a plurality of transmit antennas and a receiving device has a plurality of receive antennas. The invention also relates to a communications system and device using such a method. The invention has particular application where automatic repeat requests are applied to such a multiple-input multiple-output architecture.

DISCUSSION OF THE BACKGROUND

A typical wireless network comprises a plurality of mobile terminals, each in radio communication with an access point or base station of the network. The access points may also be in communication with a central controller that in turn may have a link to other networks, for example a fixed Ethernet-type network. Until recently considerable effort was put into designing systems so as to mitigate for the perceived detrimental effects of multipath propagation, especially prevalent in wireless LAN (local area network) and other mobile communications environments. However the described work G. J. Foschini and M. J. Gans, "On limits of wireless communications in a fading environment when using multiple antennas" *Wireless Personal Communications* vol. 6, no.3, pp.311-335, 1998 has shown that by utilising multiple antenna architectures at both the transmitter and receiver, a so-called multiple-input multiple-output (MIMO) architecture, vastly increased channel capacities are possible. Attention has also turned to the adoption of space-time coding techniques for wideband channels. Typically channel state information (CSI) for detection of such coding is acquired via training sequences and the resulting CSI estimates are then fed to a space-time decoder along with the received signal.

A particular problem arises in a communications link where a transmitter with more than one transmit antenna is employed, since signals received from different transmit antennas interfere with one another. This results in so-called multi-stream interference (MSI) and causes decoding difficulties. The potential advantage, however, is greatly increased throughput (that is, a higher bit rate) for such a communications link. In this type of MIMO (Multiple-input Multiple-output) communication link the "input" (to a matrix channel) is provided by the transmitter's plurality of transmit antennas and the "output" (from a matrix channel) is provided by a plurality of receive antennas. Thus each receive antenna receives a combination of signals from all the transmitter's transmit antennas which must be unscrambled.

Figure 1:
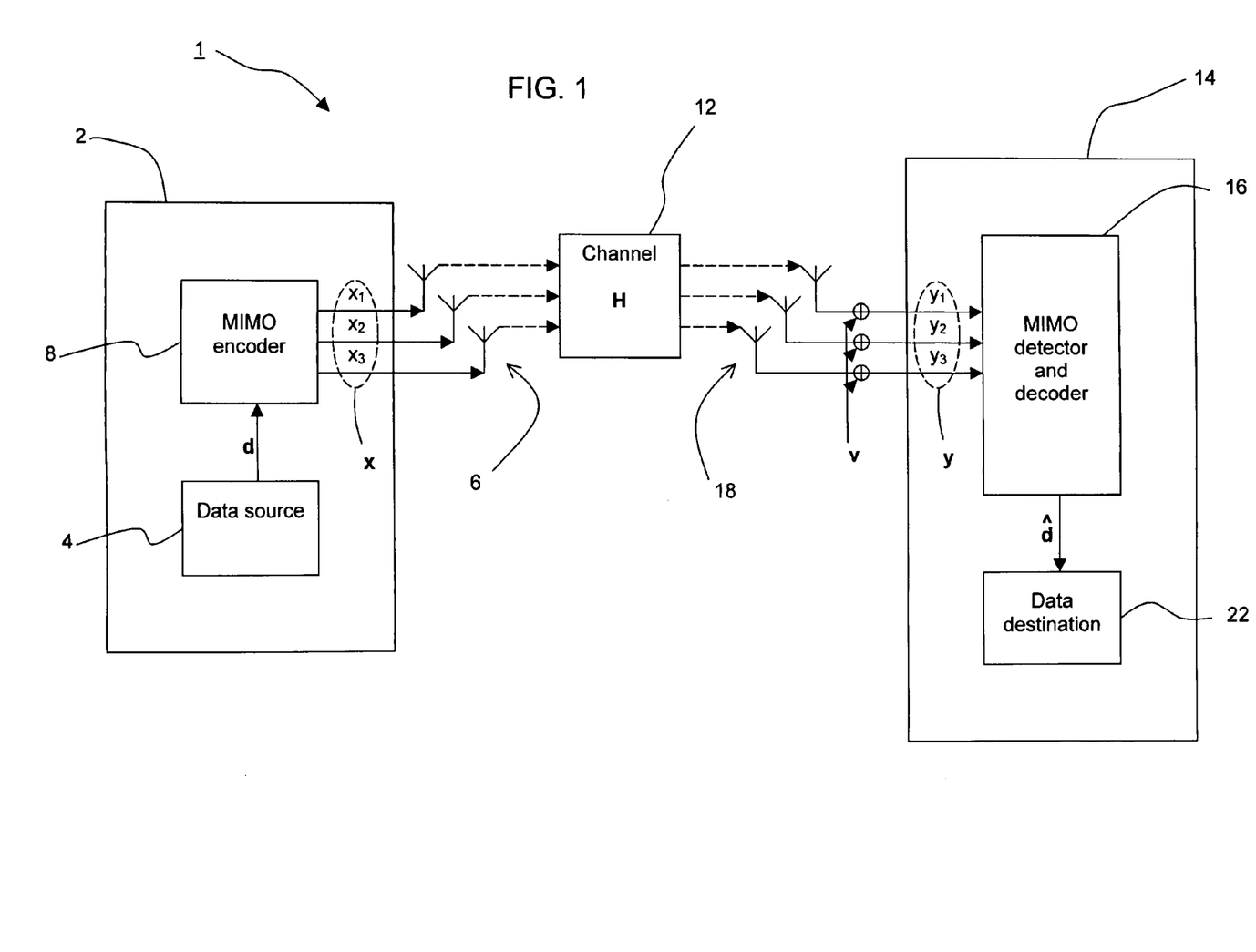
FIG. 1, discussed hereinbefore, is a schematic diagram illustrating a typical MIMO communication system.

FIG. 1 of the accompanying drawings is a schematic diagram illustrating a typical MIMO communication system 1 comprising a transmitting device 2 and a receiving device 14. In the transmitting device 2, a data source 4 provides an information symbol vector d to a MIMO encoder 8 which encodes the symbol vector d as T code symbols $x_1 x_2 \ldots, x_T$. The T code symbols $x_1 x_2 \ldots, x_T$ can be represented as transmit symbol vector x, and in this example, T is three. The T code symbols $x_1 x_2 \ldots, x_T$ are then transmitted separately and simultaneously from T transmit antennas 6 respectively. An example of a MIMO encoder 8 is found by a direct mapping of input symbol $d_i$ to output symbol $x_i$.

In the receiving device 14, a plurality R of receive antennas 18 receives respectively signals $y_1, \ldots, y_R$, represented as symbol vector y. For a narrowband channel the channel response of the channel 12 between the transmitting device 2 and the receiving device 14 are represented by an R×T channel response matrix H (having R rows and T columns of complex channel coefficients), with the noise contribution at the receiver being represented by the R-dimension noise vector v. Using this model, $$y = Hx + v. \quad (1)$$

The receive signals y are then input to a MIMO detector and decoder 16, along with an estimate of the channel response matrix, H. Channel estimation in the MIMO detector 16 can be achieved in a number of well-documented ways. These inputs to the MIMO detector 16 can be used to form an estimate $\hat{x}$ of the transmit symbol vector, or to directly form an estimate of the information symbol vector d. An example MIMO detector 16 corresponding to the example encoder described above is to generate a linear estimator matrix W equal to $H^{-1}$, so that the estimate $\hat{x}$ of the transmit symbol vector is given by:

$$\hat{x} = Wy. \quad (2)$$

This estimate $\hat{x}$ of the transmit symbol vector is then decoded by the MIMO decoder 16 by performing the reverse of the encoding operation performed by the MIMO encoder 8 to produce an estimate $\hat{d}$ of the original information symbol vector d, and this estimate $\hat{d}$ is passed to the data destination 22.

In the example above, the linear estimator matrix W effectively separates the plurality of transmitted signals arriving at the receive array. Non-linear estimators are more optimal and may employ maximum likelihood (ML) or maximum a posteriori probability (MAP) estimation techniques.

In the above example, data transmission over the channel 12 from multiple users can be handled using time division multiplexing in combination with the spatial multiplexing of MIMO so that the sequence of operations above is performed in one time frame for one user and for another user in the next time frame.

When the channel is frequency selective, this can be handled by using the OFDM (Orthogonal Frequency Division Multiplexing) technique. With standard OFDM there are a number (say, N) of overlapping tones (or sub-carriers). The bit stream is split into N parallel data streams at a rate of 1/N of the original rate. Each stream is modulated onto a unique tone and then combined to a single signal for transmission from a single antenna by means of an N-point inverse Fast Fourier Transform (IFFT). The tones are orthogonal with adjacent ones and so do not interfere. Each block of N samples output from the IFFT is known as an OFDM symbol. A fixed number of additional samples are copied from the end of each OFDM symbol and pre-pended to it. This is known as a cyclic prefix (CP). Because this CP is designed to be longer than the greatest delay of the multipath channel response, inter symbol interference (ISI) is eliminated and the data on each sub-carrier experiences a narrowband flat fading channel response.

A combined MIMO-OFDM system would operate similarly to the basic OFDM system described above where the system model for each sub-carrier can be expressed using equation (1) above. For each sub-carrier a different symbol vector, x, would be transmitted, a different signal vector, y, would be received, and a different channel response matrix, H, would be experienced. For example, if there were N sub-carriers, N MIMO-encoded transmit vectors would be generated. The N symbols corresponding to the first transmit antenna would be input to an IFFT and an OFDM symbol for the first transmit antenna created. This process would be repeated for each transmit antenna. The resultant T OFDM symbols would then be transmitted simultaneously over the multiple antennas of the MIMO system.

Third generation mobile phone networks use a form of multiplexing known as CDMA (Code Division Multiple Access) spread spectrum signals for communicating across the radio interface between a mobile station and a base station. These 3G networks are encompassed by the International Mobile Telecommunications IMT-2000 standard. Collectively the radio access portion of a 3G network is referred to as UTRAN (Universal Terrestrial Radio Access Network) and a network comprising UTRAN access networks is known as a UMTS (Universal Mobile Telecommunications System) network. The UMTS system is the subject of standards produced by the Third Generation Partnership Project (3GPP, 3GPP2), technical specifications for which can be found at www.3gpp.org. Fourth generation networks, although not yet defined, may employ MIMO-based techniques.

Multi-Carrier Code Division Multiple Access (MC-CDMA) is similar to OFDM, but data symbols are first spread as for CDMA with a spreading code having a spreading factor SF (representing the number of chips per data bit). Multiple users can therefore be supported by each user employing a different spreading code. The SF chips are then allocated to SF adjacent sub-carriers of an OFDM system, i.e. with no spreading in time. This can result in the loss of orthogonality between spreading codes at a receiver, as each sub-carrier experiences a different channel gain. However, the use of a suitable CP, as for ordinary OFDM, eliminates inter symbol interference (ISI).

Figure 2:
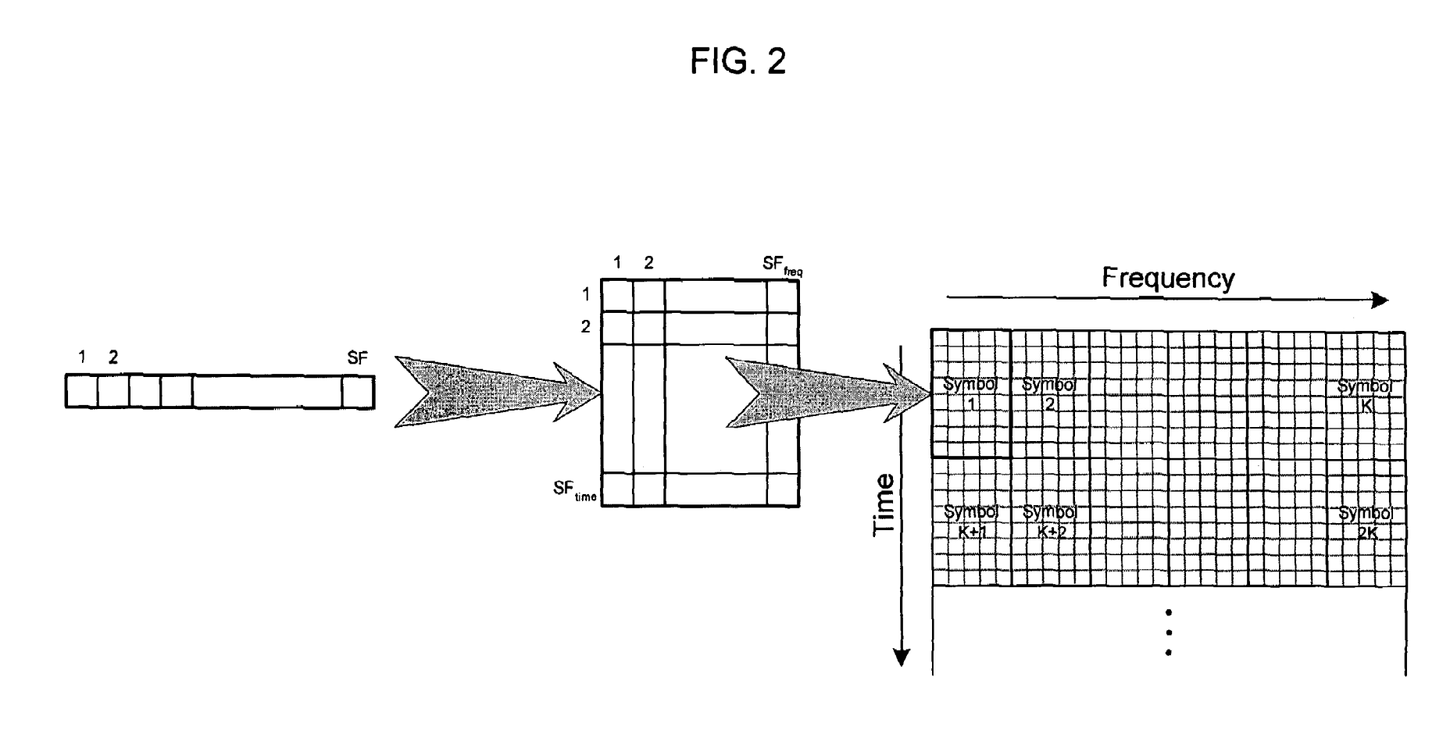
FIG. 2, also discussed hereinbefore, is a schematic illustration of the arrangement of spread chips in blocks of frequency and time in the Orthogonal Frequency Code Division Multiplexing (OFCDM) scheme.

Orthogonal Frequency Code Division Multiplexing (OFCDM) is similar to MC-CDMA, but the chips resulting from spreading a single symbol can be arranged in blocks of frequency and time, so that each data symbol is allocated to a number of sub-carriers and a number of OFDM symbols on those sub-carriers. The dimensions of the block can be altered, for example the spreading can be SF in time and 1 in frequency, or vice versa, or some other combination making up SF chips. This is illustrated in FIG. 2 of the accompanying drawings. In the example of FIG. 2, the overall spreading factor SF illustrated in the left-most portion is allocated with a spreading factor $SF_{time}$ in the time domain and $SF_{freq}$ in the frequency domain, as illustrated in the middle portion of FIG. 2. As illustrated in the right-most portion of FIG. 2, the chips of the first symbol (Symbol 1) of user data are allocated across the first $SF_{freq}$ subcarriers and the first $SF_{time}$ OFDM symbols. The next symbol (Symbol 2) of user data is spread and allocated in a similar way, being allocated to the next $SF_{freq}$ subcarriers and the same $SF_{time}$ OFDM symbols. This is repeated until all the subcarriers are filled with the user's data (with Symbol K occupying the final $SF_{freq}$ subcarriers). The $SF_{time}$ OFDM symbols can then be transmitted, and the next $SF_{time}$ OFDM symbols can then be allocated and transmitted in the same way. Thus a single user data fills all subcarriers (N/$SF_{freq}$ must be an integer, in this example equal to K). In the right-most portion of FIG. 2, the allocation is schematically shown as $SF_{freq}=5$ and $SF_{time}=8$ by the grid division illustrated within each symbol. MC-CDMA can be described as an OFCDM system where symbols are always spread by a factor of SF in frequency and 1 in time.

As an alternative to the usual OFCDM scheme described above in which spreading is carried out first and the resulting chips then allocated to the time and frequency domains as in FIG. 2, time and frequency spreading can be carried out sequentially. A time spreading code of length $SF_{time}$ (the time spreading factor) would indicate both the amount of spreading in the time domain (indicated by $SF_{time}$) and the form of spreading (indicated by the type of time spreading code). A frequency spreading code having a frequency spreading factor $SF_{freq}$ would indicate the amount of spreading to be performed in the frequency domain, or the number of frequency sub-carriers across which the data symbol is to be spread.

Figure 3:
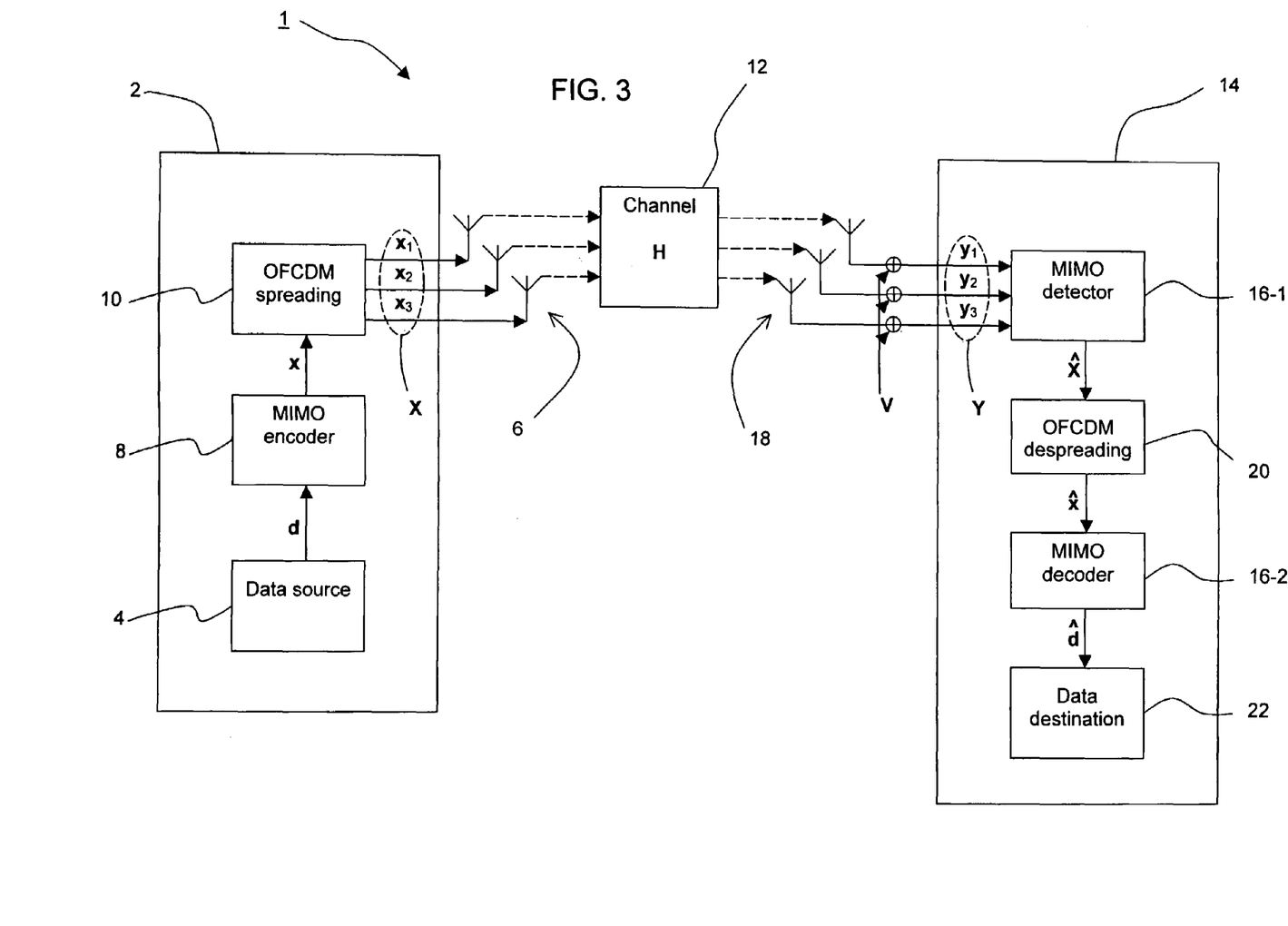
FIG. 3, also discussed hereinbefore, is a schematic diagram illustrating the MIMO communication system of FIG. 1 adapted to the OFCDM scheme.

FIG. 3 of the accompanying drawings shows how the MIMO communication system 1 of FIG. 1 can be modified to enable data from multiple users to be multiplexed according to the OFCDM scheme. To simplify the explanation, only the data from a single user will be illustrated; the data from other users is spread in frequency and time in a corresponding way and combined onto the same transmit signals described below.

As for the MIMO system of FIG. 1, in the transmitting device, a data source 4 provides an information symbol vector d to a MIMO encoder 8 which encodes the symbol vector d to a T-dimensional symbol vector x. Unlike in the MIMO system of FIG. 1, in the MIMO-OFCDM system of FIG. 3, the symbol vector x is then processed by an OFCDM spreading portion 10 before transmission. The symbol vector x is spread in time to give a T×$SF_{time}$ transmit chip matrix X (T rows and $SF_{time}$ columns), where $SF_{time}$ is the spreading factor in the time dimension. The transmit chip matrix X is also spread across $SF_{freq}$ adjacent frequency sub-carriers as described above and the various sub-carriers combined before transmission over the T transmit antennas 6.

The response of the channel 12 between the transmitting device 2 and the receiving device 14, for a single sub-carrier, is again represented by a R×T channel response matrix H (R rows and T columns), with the noise contribution now being represented by a R×$SF_{time}$ matrix V.

Using the above channel model, the R×$SF_{time}$ chip matrix Y received at the receiving device 14, can be represented as:

$$Y=HX+V.$$

The received signals Y are then input to a MIMO detector 16-1. As before, the MIMO detector 16-1 requires an estimate of the channel response matrix, H, which can be obtained using methods well known to someone skilled in the art. An example MIMO detector 16-1 is to generate a linear estimator matrix W equal to $H^{-1}$ so that the estimate $\hat{X}$ of the transmit chip matrix is given by:

$$\hat{X}=WY.$$

This is performed separately for each sub-carrier. The estimates $\hat{X}$ of the transmit chip matrix for each sub-carrier are then passed to an OFCDM despreading portion 20 which performs the reverse of the spreading performed by the OFCDM spreading portion 10, resulting in an estimate $\hat{x}$ of the T-dimension symbol vector x. This estimate is then decoded by the MIMO decoder 16-2 by performing the reverse of the encoding operation performed by the MIMO encoder 8 to produce an estimate $\hat{d}$ of the original data symbol vector d, and this estimate $\hat{d}$ is passed to the data destination 22.

Practical MIMO systems can benefit from the selection and use of a set of antennas from a total greater than the number of transmit and/or receive hardware chains. If, for example, a system had four transmit and four receive radio frequency (RF) chains, but had eight antennas available at each end, it could choose which four out of the eight antennas would give it the best performance. This allows hardware (space, cost and power) savings to be made, since only four transmit and four receive RF chains would be required to be built, whilst still gaining some of the benefits of having a larger number of antennas. The only duplication is the antenna elements themselves (which are relatively low cost), and the small overhead introduced by the additional RF switching (which is still more economical than multiple transmit and receive chains). This use of antenna subset selection could be employed at the transmitter, the receiver, or both.

Various methods have been proposed as to how a system would decide what the best subset of antennas is. For example, in "MIMO antenna subset selection with space-time coding", D. A. Gore and A. J. Paulraj, IEEE Trans. Signal Processing, Vol. 50, No. 10, October 2002, pp. 2580-2588, two cases are differentiated based on the type of channel knowledge used in the selection process. In the first case, the antenna subsets are selected based on exact channel knowledge (ECK). In the second case, statistical channel knowledge (SCK) is employed by the selection algorithm. When ECK is available, it is shown that the selection algorithm chooses the antenna set that maximizes the channel Frobenius norm leading to both coding and diversity gain.

When SCK is available, the selection algorithm chooses the antenna set that maximizes the determinant of the covariance of the vectorized channel leading mostly to a coding gain.

In "Antenna selection for spatial multiplexing systems based on minimum error rate", R. W. Heath and A. Paulraj, in Proc IEEE ICC, 2001, pp. 2276-2280, spatial multiplexing with multiple antennas is employed at both the transmitter and receiver to take advantage of large capacity gains. A criteria for selecting the optimal antenna subset is presented in terms of minimum error rate, when coherent receivers, either linear or maximum likelihood (ML), are used over a slowly varying channel. For the ML receiver the subset whose output constellation has the largest minimum Euclidean distance is picked. For the linear receiver post-processing SNRs (signal to noise ratios) of the multiplexed streams is used whereby the antenna subset that induces the largest minimum SNR is chosen.

In packet-based communication systems, some packets will be received incorrectly, or not received at all. When this is recognised by the receiver, through a mechanism such as verifying cyclic redundancy code (CRC) check bits, a NACK (Negative Acknowledgement) packet is sent back to the transmitter, in order to instruct it to retransmit the lost or corrupted packet. In a Hybrid-ARQ (Hybrid Automatic Repeat request, H-ARQ) system, there are different methods by which this retransmission can occur. One method is to retransmit exactly the same packet as was initially sent, and allow the receiver to either decode the second packet alone, or combine it with the first packet to improve the signal to noise ratio (Chase combining). Another method is for the transmitter to alter the puncturing of the output from its channel encoder for the second packet so that different parity bits are transmitted. Whilst this allows the second packet to be decoded in isolation from the first packet (if this is required for some reason), the data from the two packets can be combined so that the decoder has an increased number of parity bits for each transmitted information bit (known as incremental redundancy).

The direct application of the above H-ARQ methods (Chase combining and incremental redundancy) to MIMO systems has been considered in "The performance of BLAST with hybrid ARQ in Ricean fading channels", H. Zheng, in Proc. IEEE VTC, October 2001, pp. 901-904.

The performance of MIMO systems with H-ARQ can be improved by modifying the retransmitted packet in different ways, and one such method for doing so is reported in "Hybrid ARQ protocols using space-time codes", A. Van Nguyen and M. A. Ingram, in Proc. IEEE VTC, October 2001, pp. 2364-2368. In this paper, the performance of space-time codes (STCs) in a pure ARQ protocol (ST-ARQ) is first examined. Two hybrid ARQ schemes using STC are then proposed: space-time hybrid ARQ (ST-HARQ) and turbo space-time hybrid ARQ (TST-HARQ). For the ST-HARQ scheme, the previous transmitted packets are combined with the current received packet. In this scheme, the diversity gain is increased with every retransmission resulting in a higher probability of an accepted packet. For the TST-HARQ scheme, the transmitted packets are code combined and iteratively decoded.

Another such method is reported in "Hybrid ARQ transmission and combining for MIMO systems", E. N. Onggosanusi, A. G. Dabak, Yan Hui and Gibong Jeong, in Proc. IEEE ICC, 2003, pp. 3205-3209. In this paper, two HARQ combining schemes are proposed at the receiver side, namely pre-combining and post-combining, the former being shown to be superior to the latter. In addition, a transmission technique, termed basis hopping, is presented which improves the HARQ diversity gain especially in slow fading channels. Pre-combining can be used in conjunction with the basis hopping technique.

SUMMARY OF THE INVENTION

According to a first aspect of the present invention there is provided a communications method for use in a communications system comprising a transmitting device having a plurality of transmit antennas and a receiving device having a plurality of receive antennas, the method comprising determining that an error has occurred in a first data transmission attempt in which data signals are transmitted from a first selection of transmit antennas for receipt at a second selection of receive antennas, and in response to such a determination performing a second data transmission attempt in which the data signals are re-transmitted from a third selection of transmit antennas for receipt at a fourth selection of receive antennas, performing a reconfiguration operation to ensure that the channel response between the transmit and receive antennas selected for the first transmission attempt is different to the channel response between the transmit and receive antennas selected for the second transmission attempt, and further comprising recovering data at the receiving device using information from the first and second transmission attempts.

The reconfiguration operation may comprise making the first selection different to the third selection.

The reconfiguration operation may comprise making the second selection different to the fourth selection.

At least one of the second, third and fourth selections may be made based on an actual or estimated channel response between the transmit and receive antennas for the first transmission attempt. At least one of the third and fourth selections may be made based on an actual or estimated channel response between the transmit and receive antennas for the second transmission attempt.

The reconfiguration operation may comprise ensuring that at least one transmission characteristic of at least one antenna common to the first and third selections is different for the first and second transmission attempts. The at least one transmission characteristic or property may comprise the transmission mode of the antenna(s), such as the polarisation or resonant mode of excitation.

The reconfiguration operation may comprise ensuring that a reception characteristic of at least one antenna common to both the second and fourth selections is different for the first and second transmission attempts.

The at least one transmission/reception characteristic may be altered by use of a physical structure in the vicinity of the antenna(s).

The transmission error in the first attempt may be notified to the transmitting device by sending a Negative Acknowledgement, NACK, packet from the receiving device to the transmitting device. Alternatively, the transmission error in the first attempt may be notified to the transmitting device when the transmitting device does not receive a positive acknowledgement, ACK, packet from the receiving device.

The communications method may comprise, for a particular transmission attempt: spreading each of $n_T$ symbols in the time domain only to produce $n_T$ time sequences of chips; transmitting the $n_T$ time sequences of chips from the $n_T$ transmit antennas respectively of the transmitting device in the selection of transmit antennas for that transmission attempt; despreading each of $n_R$ time sequences of chips received from the transmitting device at the $n_R$ receive antennas respectively of the receiving device in the selection of receive antennas for that transmission attempt to produce $n_R$ received symbols; and processing the $n_R$ received symbols to produce an estimate of the $n_T$ symbols spread at the transmitting device.

The reconfiguration operation may comprise employing a channel scrambler at the transmitting device to scramble signals before transmission from the selected transmit antennas in at least one of the first and second transmission attempts to produce different effective channel conditions. This scrambling may take the form of a multiplication to the transmit signal vector by an appropriately-designed scrambling matrix.

The first and third selections may each comprise between one and all of the available transmit antennas.

The second and fourth selections may each comprise between one and all of the available receive antennas.

The number of antennas in the first and third selections may be the same. The antennas in the first and third selections may be the same.

The number of antennas in the second and fourth selections may be the same. The antennas in the second and fourth selections may be the same.

The communications system may be a Multiple Input Multiple Output system.

The data signals may be modulated onto one or more sub-carriers prior to transmission. The one or more sub-carriers may be sub-carriers in an Orthogonal Frequency Division Multiplexing scheme. The data signals may be spread prior to transmission with a user-specific spreading code, with each user of the communications system being allocated a different spreading code. The spreading codes allocated to each user may be orthogonal spreading codes. Spreading may be performed according to the Orthogonal Frequency Code Division Multiplexing scheme.

Data may be recovered at the receiving device by detecting and decoding based on the signals received from the second transmission attempt, with the aid of a-priori information obtained during the detection and decoding of the first transmission attempt. The a-priori information may be soft log-likelihood information.

Data may also be recovered at the receiving device by detecting and decoding based on an aggregate of at least some signals received from the first transmission attempt with at least some signals received from the second transmission attempt. The aggregate may comprise all of the signals received from the first and second transmission attempts. Or, the aggregate may comprise a selection of signals received from the first and second transmission attempts. At least part of the selection may be chosen at random. At least part of the selection may be chosen based on the channel response.

According to a second aspect of the present invention there is provided a communications system comprising: a transmitting device having a plurality of transmit antennas; a receiving device having a plurality of receive antennas; means for determining that an error has occurred in a first data transmission attempt in which data signals are transmitted from a first selection of transmit antennas for receipt at a second selection of receive antennas; means for performing, in response to such a determination, a second data transmission attempt in which the data signals are re-transmitted from a third selection of transmit antennas for receipt at a fourth selection of receive antennas; means for performing a reconfiguration operation to ensure that the channel response between the transmit and receive antennas selected for the first transmission attempt is different to the channel response between the transmit and receive antennas selected for the second transmission attempt; and means for recovering data at the receiving device using information from the first and second transmission attempts.

According to a third aspect of the present invention there is provided communications method for use by a transmitting device having a plurality of transmit antennas in a communications system also comprising a receiving device having a plurality of receive antennas, the method comprising determining that an error has occurred in a first data transmission attempt in which data signals are transmitted from a first selection of transmit antennas for receipt at a second selection of receive antennas, and in response to such a determination performing a second data transmission attempt in which the data signals are re-transmitted from a third selection of transmit antennas for receipt at a fourth selection of receive antennas, performing a reconfiguration operation to ensure that the channel response between the transmit and receive antennas selected for the first transmission attempt is different to the channel response between the transmit and receive antennas selected for the-second transmission attempt, such that data can be recovered at the receiving device using information from the first and second transmission attempts.

According to a fourth aspect of the present invention there is provided communications device having a plurality of transmit antennas for use in a communications system also comprising a receiving device having a plurality of receive antennas, the communications device further comprising means for determining that an error has occurred in a first data transmission attempt in which data signals are transmitted from a first selection of transmit antennas for receipt at a second selection of receive antennas, means for performing, in response to such a determination, a second data transmission attempt in which the data signals are re-transmitted from a third selection of transmit antennas for receipt at a fourth selection of receive antennas, means for performing a reconfiguration operation to ensure that the channel response between the transmit and receive antennas selected for the first transmission attempt is different to the channel response between the transmit and receive antennas selected for the second transmission attempt, such that data can be recovered at the receiving device using information from the first and second transmission attempts.

According to a fifth aspect of the present invention there is provided communications method for use by a receiving device having a plurality of receive antennas in a communications system also comprising a transmitting device having a plurality of transmit antennas, the method comprising determining that an error has occurred in a first data transmission attempt in which data signals are transmitted from a first selection of transmit antennas for receipt at a second selection of receive antennas, and in response to such a determination performing a second data transmission attempt in which the data signals are re-transmitted from a third selection of transmit antennas for receipt at a fourth selection of receive antennas, performing a reconfiguration operation to ensure that the channel response between the transmit and receive antennas selected for the first transmission attempt is different to the channel response between the transmit and receive antennas selected for the second transmission attempt, and recovering data at the receiving device using information from the first and second transmission attempts.

According to a sixth aspect of the present invention there is provided a communications device having a plurality of receive antennas for use in a communications system also comprising a transmitting device having a plurality of transmit antennas, the communications device further comprising means for determining that an error has occurred in a first data transmission attempt in which data signals are transmitted from a first selection of transmit antennas for receipt at a second selection of receive antennas, means for performing, in response to such a determination, a second data transmission attempt in which the data signals are re-transmitted from a third selection of transmit antennas for receipt at a fourth selection of receive antennas, means for performing a reconfiguration operation to ensure that the channel response between the transmit and receive antennas selected for the first transmission attempt is different to the channel response between the transmit and receive antennas selected for the second transmission attempt, and means for recovering data using information from the first and second transmission attempts.

According to a seventh aspect of the present invention there is provided an operating program which, when run on a communications device, causes the device to carry out a method according to the third or fifth aspect of the present invention.

According to an eighth aspect of the present invention there is provided an operating program which, when loaded into a communications device, causes the device to become one according to the fourth or sixth aspect of the present invention.

The operating program may be carried on a carrier medium, which may be a transmission medium or a storage medium.

BRIEF DESCRIPTION OF THE DRAWINGS

Reference will now be made, by way of example, to the accompanying drawings, in which.

DESCRIPTION OF THE PREFERRED EMBODIMENTS

Before a detailed description of specific embodiments of the present invention, an example of the basic concepts underlying the embodiments will first be explained.

As described above with reference to FIG. 1, a single carrier narrowband MIMO system can be represented as:

$$y = Hx + v$$

where x is the T×1 vector of symbols to be transmitted from the T transmit antennas 6, y is the R×1 vector of signals from the R receive antennas 18, H is the R×T matrix of complex channel coefficients between the two antenna arrays, and v is the R×1 vector of Additive White Gaussian Noise (AGWN).

When a packet is detected to have been received in error during a first transmission attempt, rather than completely disregard the information gleaned from the failed transmission attempt, this information could be stored and used to assist detection of the retransmitted packet. The request for retransmission could be signalled by means of a NACK packet being sent, or in any other way.

If the retransmitted packet is sent in a second transmission attempt with the same data payload, the system can be rewritten as:

$$\tilde{y} = \tilde{H}\tilde{x} + \tilde{v} \text{ where}$$

$$\tilde{y} = \begin{bmatrix} y_1 \\ y_2 \end{bmatrix}, \tilde{H} = \begin{bmatrix} H_1 \\ H_2 \end{bmatrix}, \tilde{x} = \begin{bmatrix} x \\ x \end{bmatrix} \text{ and } \tilde{v} = \begin{bmatrix} v_1 \\ v_2 \end{bmatrix},$$

with $y_i$, $H_i$ and $v_i$ representing the appropriate signals in the $i^{th}$ packet. Since this technique requires exactly the same data to be retransmitted, it may only be possible to apply it to the payload part of a packet (which will remain identical between both the initial and retransmitted packet) if the packet header information is changed in the retransmitted packet. However, it is likely that packet headers would be transmitted employing a different (more robust) scheme than the payload. If the packet header information is the same, then x could represent both the header and the payload portions of the packet.

H-ARQ techniques require the receiver to know that it was the intended recipient of the original packet. It must store $y_1$ and $H_1$ so that it can form the "aggregate" vectors/matrices once the retransmission has been received and $y_2$ and $H_2$ are determined. This could be achieved by the receiver knowing that signals intended for it will arrive in a particular time slot, or by the transmitter communicating the intended recipient via some other control channel, or by some other means. It should be appreciated that forming "aggregated" packets in this way is only one example of how signals from multiple received packets could be combined in an embodiment of the present invention; all that is required is that information from multiple transmission attempts is used in some way to recover data at the receiver.

Even if the channel has an identical response for both packets, the noise contributions ($v_1$ and $v_2$) will be different, and so the solution of the above (MIMO detection) problem will see a benefit. However, the combined solution of the MIMO system for the initial and repeated packet will be significantly improved if the two matrices $H_1$ and $H_2$ can be made to be as different from each other as possible.

In general $H_1$ and $H_2$ could be expected to vary by at least a small amount due to the channel changing with time, which will result in some benefit (the difference between $H_1$ and $H_2$ will be a function of the time interval between the two transmissions and the velocities of the TX/RX or any objects in the environment).

However, in an embodiment of the present invention, active steps are taken to help to ensure that the channel conditions for the first transmission attempt are different to the channel conditions for the second transmission attempt, and this would usually result in improved performance. In this context, the "channel response" between the two sets of antennas can be understood to have an equivalent or similar meaning to the "channel conditions" between the two sets of antennas.

Figure 4:
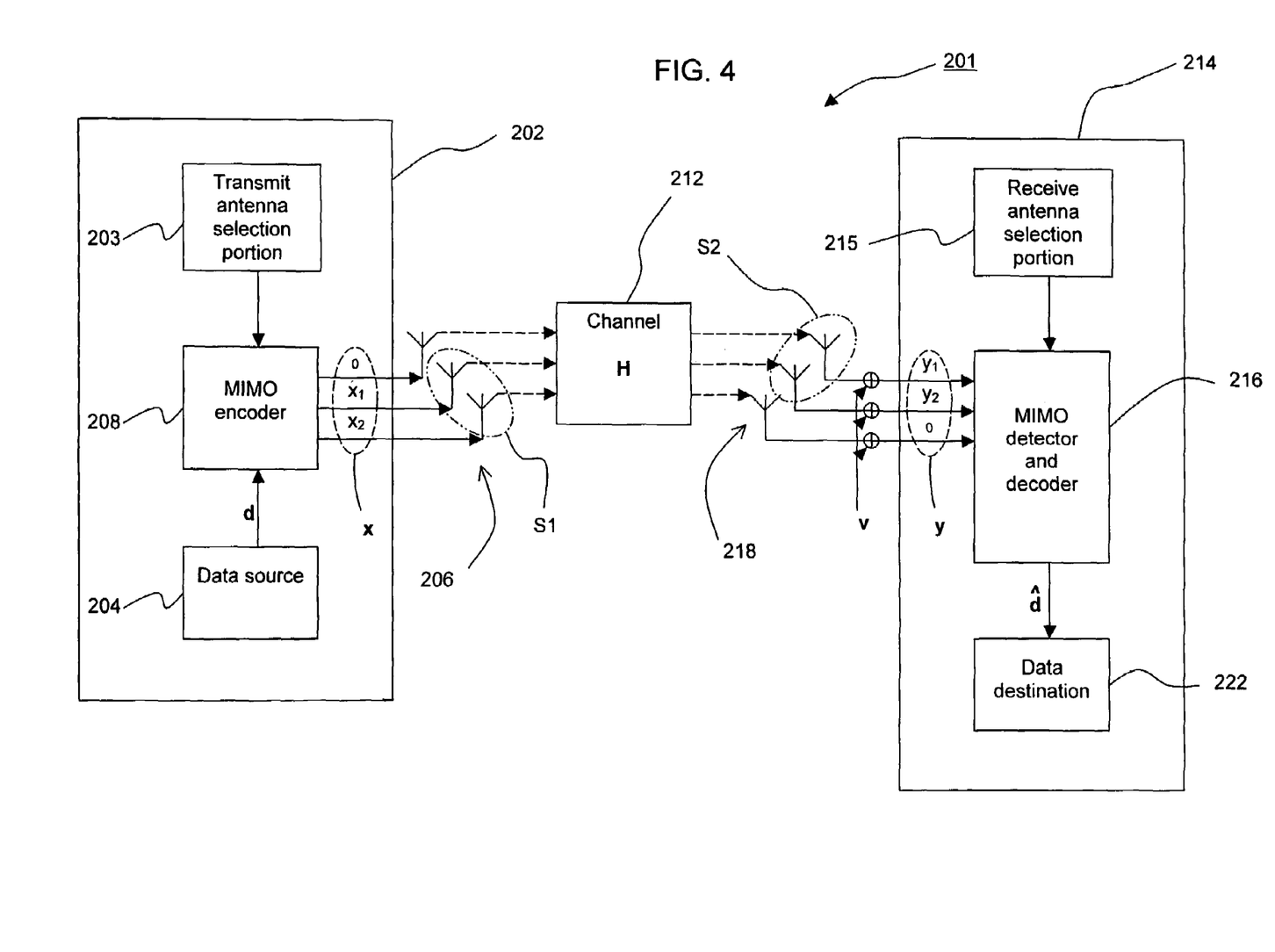
FIG. 4 is a block diagram illustrating a communications system according to a first embodiment of the present invention.

One way to ensure that $H_1$ and $H_2$ are different is through the use of antenna selection, and FIG. 4 is a schematic illustration of a first embodiment of the present invention which makes use of such a scheme. A communications system 201 according to the first embodiment is similar to the system 1 described above with reference to FIG. 1, being based on the MIMO architecture and comprising a transmitting device 202 and a receiving device 214. As for the system of FIG. 1, the transmitting device 202 comprises a data source 204, a MIMO encoder 208, and a plurality T of transmit antennas 206. Likewise, the receiving device 214 comprises a plurality R of receive antennas 218, a MIMO detector and decoder 216, and a data destination 222. The channel 212 between the transmit and receive antennas 206 and 218 is again represented in this embodiment by a channel response matrix H (comprising complex channel coefficients), with a noise vector v representing noise at the receiver. Because of the similarities between the first embodiment and the FIG. 1 system, a detailed description is not necessary, with the differences between the two systems being explained in more depth.

The principal difference between the first embodiment and the FIG. 1 system is in the addition of a transmit antenna selection portion 203 in the transmitting device 202 and a receive antenna selection portion 215 in the receiving device 214. With these antenna selection portions 202 and 215 it is possible to choose a first selection S1 of transmit antennas, being all or a subset of the total number T of available transmit antennas 206, and likewise a second selection S2 of receive antennas, being all or a subset of the total number R of available receive antennas 218, to be active for the first (initial) transmission attempt.

An example of such selections S1 and S2 are illustrated in FIG. 4, where two transmit and receive antennas are used (out of a possible three) for the first transmission attempt between the transmitting device 202 and the receiving device 214. In this example, the selection S1 comprises the second and third transmit antennas 206 and the selection S2 comprises the first and second receive antennas 218. Under control of the transmit antenna selection portion 203, the MIMO encoder 208 operates in a similar way to that described above with reference to FIG. 1, but generating and routing a number of MIMO-encoded symbols appropriate for the selection S1 being used for the transmission. Similarly, under control of the receive antenna selection portion 215, the MIMO detector and decoder 216 operates in a similar way to that described above with reference to FIG. 1, but processing only those received signals appropriate for the selection S2 being used for the reception. In the example shown in FIG. 4, x and y are vectors of symbols, H is a two-by-two matrix of channel coefficients, and v is a vector of noise contributions.

When it is determined, by an error handling portion (not shown) in the receiving device 214, that an error has-occurred in the first data transmission attempt, notification is sent from the receiving device 214 to inform the transmitting device 202 of this. An error handling portion (not shown) in the transmitting device 202 acts on this notification to initiate a second data transmission attempt in which the data signals are re-transmitted from a third selection S3 of transmit antennas 206 for receipt at a fourth selection S4 of receive antennas 218. In this embodiment, a reconfiguration operation is performed in which one or both of the selections S3 and S4 is changed from the selections S1 and S2 respectively used for the first transmission. This may be done by changing the number of antennas in the selections S3 and/or S4 as compared with the corresponding selections S1 and S2, or by keeping the same number of antennas in those selections and changing the choice of antennas within the selections. Data is then recovered data at the receiving device using information from the first and second transmission attempts, increasing the likelihood of a successful transmission. Data recovery at the receiving device 214 is described in more detail below.

The spatial diversity resulting from the above reconfiguration operation to change the antenna selection or selections helps to ensure that the channel response, represented in part by $H_1$, between the transmit and receive antennas S1 and S2 selected for the first transmission attempt is different to the channel response, represented in part by $H_2$, between the transmit and receive antennas S3 and S4 selected for the second transmission attempt. Of course, as mentioned above, the other contributions to the received signal of $v_1$ and $v_2$ will also differ from the first to the second transmission attempt, as will the inevitable changes through time variation even to channel coefficients common between $H_1$ and $H_2$.

For improved performance, it is preferable that the transmitting device 202 and/or receiving device 214 is able to select the antennas that they use from as large a number of possibilities as possible, so that the channel response seen by the second transmission attempt could be significantly different to the first, and at least sufficient to ensure the detection problem has additional information to aid its solution. It is of course not essential that both the transmitting device 202 and the receiving device 214 are provided with antenna selection capabilities; even if only one or the other has such capabilities then an improvement will be seen.

The set of antennas used during the retransmission could be selected with or without knowledge of the channel responses. If knowledge is available by some means then a more optimal selection could be obtained, but if not, the selection of antennas unused during the first transmission should still provide extra information to the receiver to aid detection.

If the data is not successfully recovered even after the second transmission attempt, then further transmission attempts can be made, with the aggregate information being used in a corresponding manner.

The type of detection process performed by the MIMO detector 216 on the combined or aggregate information can be chosen depending upon the desired complexity. Perhaps the most complex, but best, solution, would be to employ whatever detection method the receiver normally employs, but jointly to all the elements of $\tilde{y}$ as if the system had that number of receive antennas.

An alternative method would be to select a subset of elements from $\tilde{y}$. Since the full channel response would be known to the receiver (through the usual channel estimation process), these elements could be picked in an intelligent way (various metrics have been described in published papers on MIMO antenna selection, for example in the above-described Gore/Paulraj and Heath/Paulraj papers).

For example, consider the case where the selected number of transmit antennas is constant at $n_T$ and the selected number of receive antennas is constant at $n_R$, (with the selected antennas changing between transmission attempts). If a total of N transmission attempts is made then N copies of a packet will be received, so that $\tilde{y}$ will be a vector of dimension $(N*n_R)$-by-1, and $\tilde{H}$ will be a matrix of dimension $(N*n_R)$-by-$n_T$. Since the computational complexity of a method for solving a linear system is related to the dimension of the signals involved, this could rapidly increase with each subsequent retransmission (increasing N). If complexity is too high to use all available signals $(N*n_R)$, or if sufficient memory is not available to store all that information for use with the next retransmission, a more selective approach could be taken. The selection of M out of the $N*n_R$ values in $\tilde{y}$ could be done in various ways.

The simplest method would be select M out of the $N*n_R$ values in $\tilde{y}$ at random, and to form the reduced version of $\tilde{H}$ by picking the corresponding rows. An alternative approach that should yield better performance is to pick M out of the $N*n_R$ values in $\tilde{y}$, and to also form the reduced version of $\tilde{H}$ by picking the corresponding rows, in some intelligent manner. This problem is akin to that of antenna selection in a MIMO system, where a receiver possibly has a large number of antenna elements available, but a smaller number of RF chains. It must therefore choose which of the physical antenna elements to connect to the limited number of RF chains. The choice is usually determined by analysis of the channel response (in this case, $\tilde{H}$).

Another alternative would be for the receiving device 214 to process only the data received in the second transmission attempt, but with the aid of a-priori information about each bit (e.g. soft log-likelihood information), obtained during the detection and decoding of the first transmission attempt.

The conventional methods of Hybrid-ARQ essentially provide two advantages; temporal diversity gain through Chase combining, and also coding gain in the case of incremental redundancy. Whilst the temporal diversity advantage is also obtained in a scheme embodying the present invention, the use of a different set of antennas (at the transmitting device and/or the receiving device) could substantially increase the spatial diversity gain, as well as the spatial multiplexing performance. The latter is the ability of the MIMO channel to support parallel data streams, the quality of which is determined by the condition of the channel matrix. As the effective channel ($\tilde{H}$) becomes increasingly over-determined, the ability to separate the signals from each transmit antenna will improve. The performance of such a Hybrid-ARQ system should certainly improve upon the simplest implementation in which the first transmission attempt is discarded with only the retransmitted packet being processed. The above advantages are gained with only a relatively minor increase in processing required at the receiver (for the retransmitted packet), and a small additional memory requirement imposed by having to store information from the failed packet reception whilst waiting for the retransmission to arrive.

In the first embodiment, the reconfiguration operation which was performed to ensure that the channel response between the transmit and receive antennas selected for the first transmission attempt is different to the channel response between the transmit and receive antennas selected for the second transmission attempt was to change one or both of the transmit and receive antenna selections. However, it is not essential that the reconfiguration operation involves any change in antenna selection in order to change the channel response, as will now be explained with reference to further embodiments of the present invention.

Figure 5:
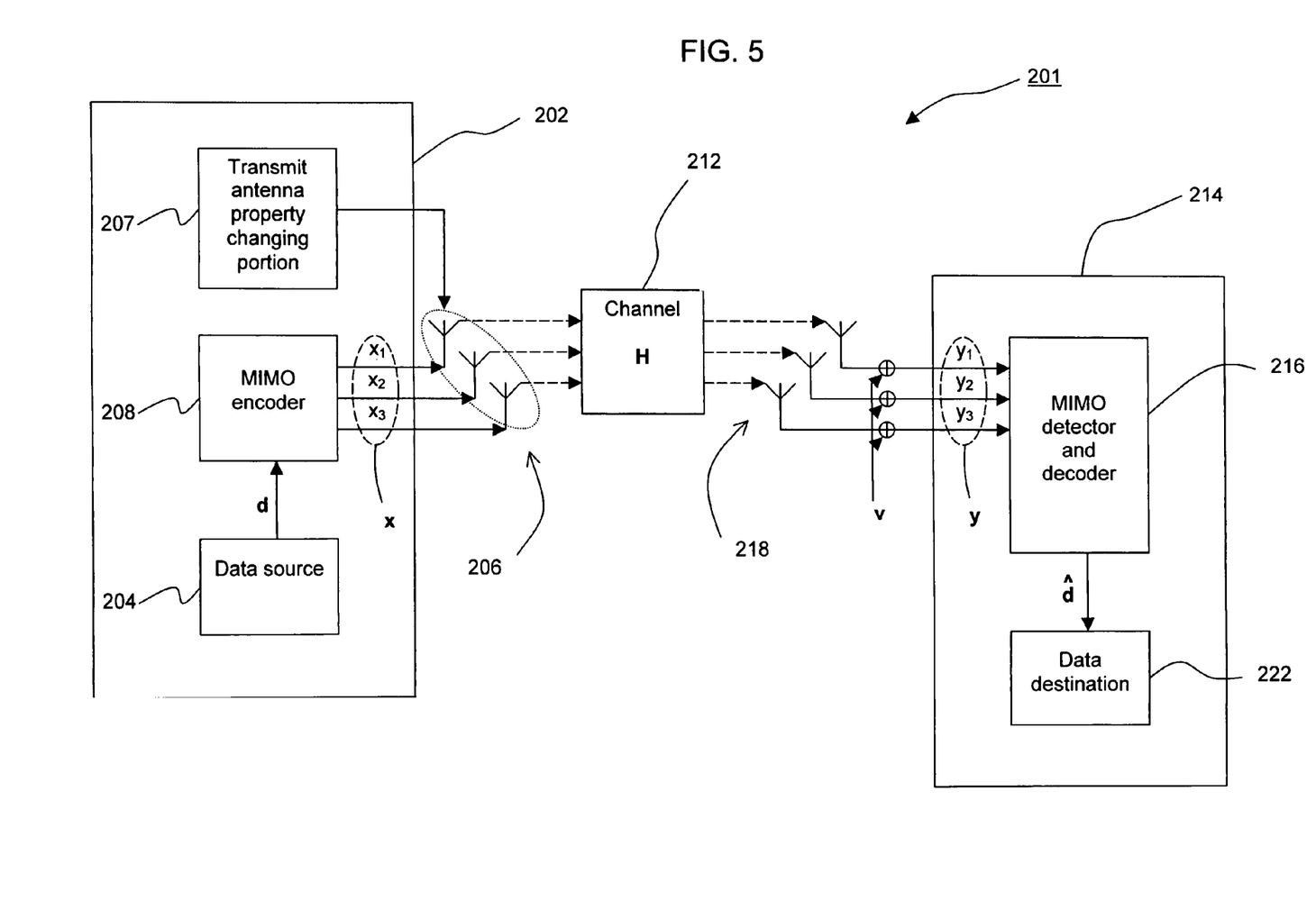
FIG. 5 is a block diagram illustrating a communications system according to a second embodiment of the present invention.

FIG. 5 is a schematic illustration of a second embodiment of the present invention. The composition and operation of the second embodiment is similar to the first embodiment, with like-numbered parts performing the same or corresponding function, and so a detailed description is not necessary. The principal difference between the first and second embodiments is that in the second embodiment a transmit antenna property changing portion 207 is provided in place of the transmit antenna selection portion 203. There is no receive antenna selection portion 215.

Therefore in the second embodiment the same transmit and receive antennas 206 and 218 are used for the first and the second transmission attempts. Instead of using antenna selection in a reconfiguration operation to change the channel response between first and second transmission attempts as in the first embodiment, the same physical transmit antenna elements are used but at least one of them is excited with a different polarisation or resonant mode.

In a modification to the second embodiment, the communications system 201 could alternatively keep the same set of antennas, but use some other artificial structure or device in order to ensure that the channel response is different for the first and retransmitted packets. This could take the form of a physical device or scattering structure located in front of, or around, the transmit antenna arrays, as is described in our co-pending United Kingdom application no. 0230030.9, and United Kingdom patent application no. 0300358.9. In both of these references, some control of the antenna responses can be achieved by use of electrical loading of the scattering structure.

In a further modification to the second embodiment, a receive antenna property changing portion can be provided in the receiving device 214 to perform a function corresponding to the transmit antenna property changing portion 207 described above. Likewise it would be possible to have an antenna property changing portion only in the receiving device 214.

In the first and second embodiments, the reconfiguration operation to ensure that the channel response between the transmit and receive antennas selected for the first transmission attempt is different to the channel response between the transmit and receive antennas selected for the second transmission attempt was performed by altering the selection and/or characteristics of the antennas. It is also possible to alter the effective channel conditions or response by use of a channel scrambler in the transmitting device 202 as is described in our co-pending United Kingdom patent application no. 0329822.1, as will now be explained with a third embodiment of the present invention.

Figure 6:
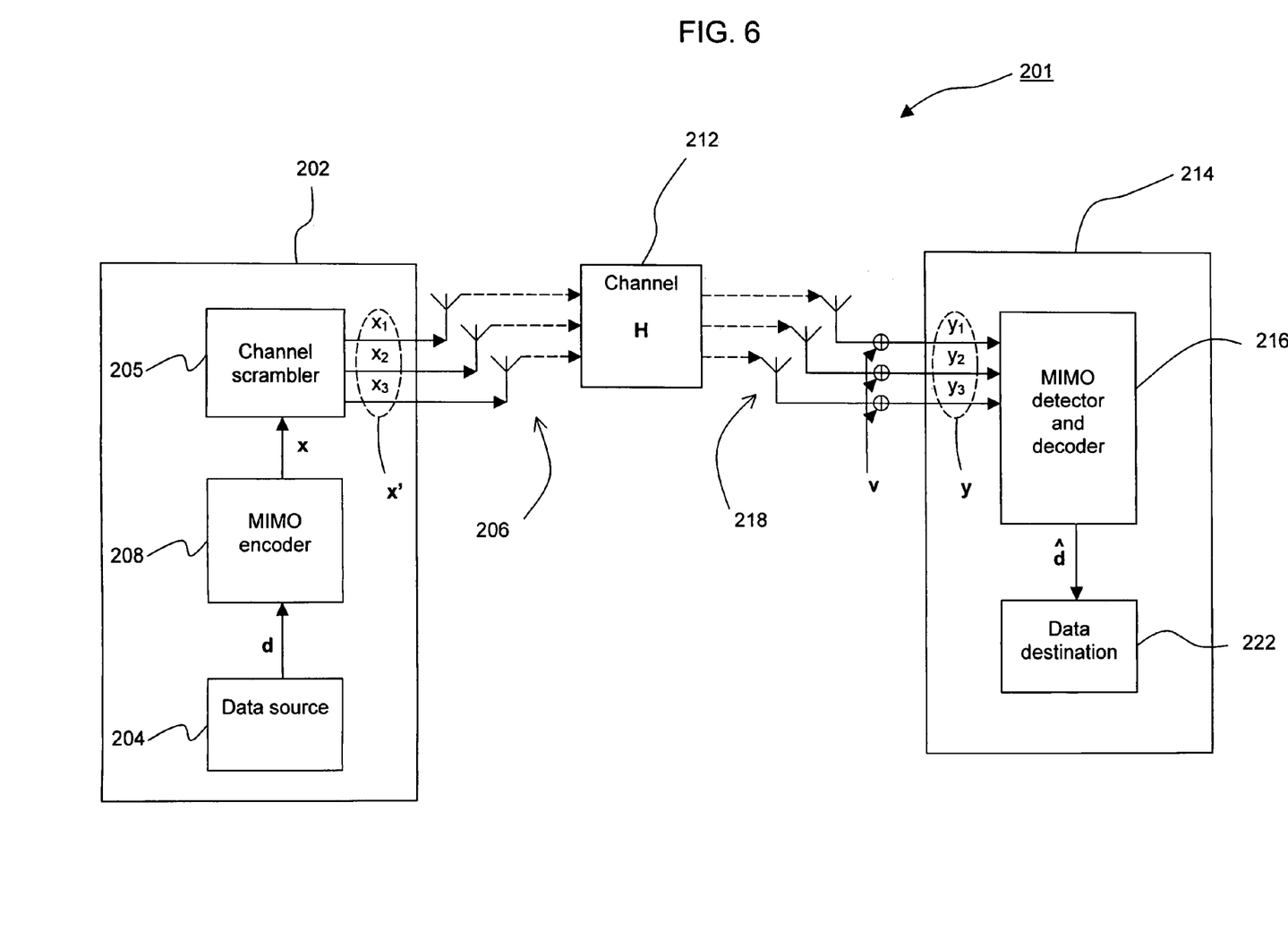
FIG. 6 is a block diagram illustrating a communications system according to a third embodiment of the present invention.

FIG. 6 is a schematic illustration of the third embodiment of the present invention. The composition and operation of the third embodiment is similar to the first embodiment, with like-numbered parts performing the same or corresponding function, and so a detailed description is not necessary. The principal difference between the first and third embodiments is that in the third embodiment a channel scrambler 205 is provided instead of the transmit antenna selection portion 203, and is arranged between the MIMO encoder 208 and the transmit antennas 206. There is also no receive antenna selection portion 215.

Therefore in the third embodiment the same transmit and receive antennas 206 and 218 are used for the first and the second transmission attempts. Instead of using antenna selection in a reconfiguration operation to change the channel conditions or response between first and second transmission attempts as in the first embodiment, the same physical transmit antenna elements are used but the channel scrambler 205 is used to create an effective change in the channel conditions for the second transmission attempt. Only a brief description of the channel scrambler 205 will be provided here; further information can be obtained from the above-referenced United Kingdom patent application.

The channel scrambler 205 acts on the symbol vector x after it has been encoded by the MIMO encoder 208, but before it is transmitted into the channel 212 by the antennas 206. The channel scrambler 205 introduces a component into the transmitted signal, with the input-output relationship being altered as follows:

$$y=HQx+v$$

where H, y, x and v are as defined above, and Q is a channel scrambler matrix representing the function performed by the channel scrambler 205.

The introduction of the channel scrambler Q effectively creates a new equivalent channel $\tilde{H}=HQ$ which can be altered between transmission attempts even if the channel H is constant. Thus if the channel H is constant, such that little or no new information would be provided by the second transmission attempt, the provision of new, pseudo-random channels $\tilde{H}$ will help the channel decoder. It will be appreciated that this technique will be applicable to a wideband channel, as well as the narrowband channel illustrated.

There are several possible ways of creating channel scrambler Q. One simple method involves the use of a rotation matrix P applied once for each symbol. This generates a channel scrambler $Q_k=P^k$, k=1 ... $N_{sym}$ where $N_{sym}$ is the number of symbol intervals in a block. If P is a unitary matrix, then $P^k$ will also be unitary for all k. The matrix P could, for example, be designed in the same way as for linear precoding, as described by Y. Xin, Z. Wang and G. Giannakis in "Space-time constellation-rotating codes maximising diversity and coding gains", Globecom 2001, vol. 1, pp. 455-459, 2001, where the objective is to spread data symbols over all antennas to achieve maximum diversity. However, in that application, the same matrix P is applied at all times, i.e. $Q_k=P$, k=1 ... $N_{sym}$, so pseudo-random scrambling of the channel is not achieved.

The person skilled in the art will appreciate that there are many workable combinations of the above-described embodiments. For example, a combination of the first and second embodiments is possible whereby both antenna selection and antenna property changing is performed. For example the transmitting device 202 could perform antenna selection while the receiving device 214 performs antenna property changing, or one or both of the devices 202 and 214 could perform both functions. The channel scrambler 205 of the third embodiment could also be used in combination with the transmit antenna selection portion 203 of the first embodiment. Other combinations will be readily apparent to the person skilled in the art.

The above embodiments can also be adapted from operation in a standard MIMO context to operation in the type of MIMO-OFCDM architecture described above with reference to FIG. 3. This would be achieved by inclusion of OFCDM spreading and despreading portions in a similar manner as described above when comparing the FIG. 3 system with the FIG. 1 system. An embodiment of the present invention can also be adapted to operation in the context of the MIMO-OFDM architecture described above.

Figure 7:
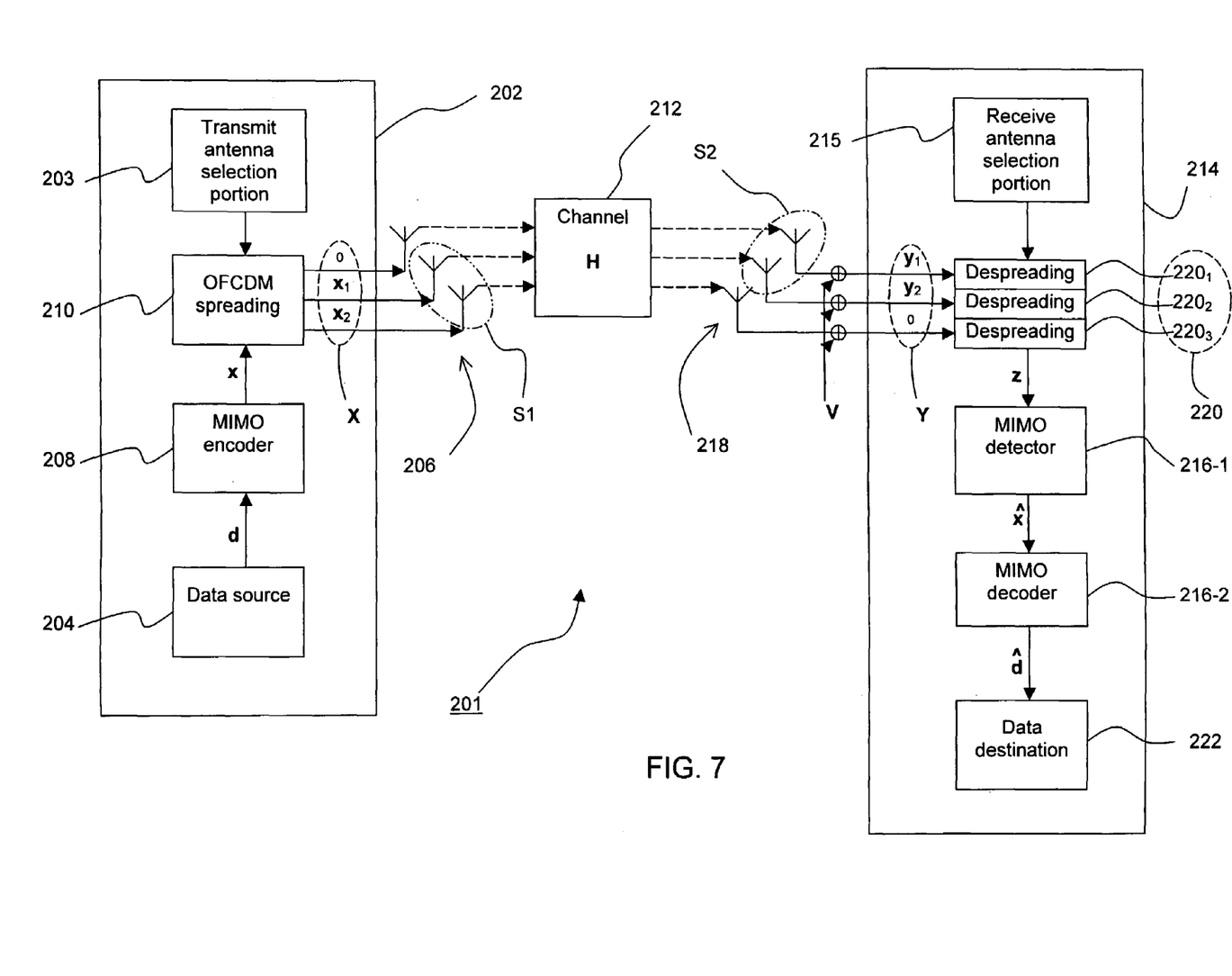
FIG. 7 is a block diagram illustrating a communications system according to a fourth embodiment of the present invention.

An embodiment of the present invention can also be applied to a MIMO-OFCDM-technique according to the disclosure in our co-pending United Kingdom application no. GB 0404451.7 [agent's ref GBP89278/TRLP090/P52989GB]. In that application, a MIMO-OFCDM technique is disclosed in which OFCDM spreading is performed in the time domain only, which allows despreading to be performed at the receiving device before MIMO detection, rather than after MIMO detection. This leads to a reduction in computational complexity and allows non-linear MIMO detection functions to be used. FIG. 7 is a schematic illustration of a fourth embodiment of the present invention in which such a MIMO-OFCDM technique is employed.

The composition and operation of the fourth embodiment is similar to the MIMO-OFCDM communications system described above with reference to FIG. 3 when adapted to include the antenna selection portions 203 and 215 of the first embodiment, with like-numbered parts performing the same or corresponding function.

Unlike for the system described above with reference to FIG. 3, in the fourth embodiment of the present invention there is no spreading in the frequency domain, only spreading in the time domain by a spreading factor SF. The time sequences of chips contained in the transmit chip matrix X are separately modulated onto a sub-carrier prior to transmission separately from the respective transmit antennas 116 selected for transmission. In this embodiment, a sub-carrier is a sub-carrier in an Orthogonal Frequency Division Multiplex (OFDM) scheme. Successive time-spread symbols for a user are allocated to successive OFDM sub-carriers on each selected transmit antenna until all sub-carriers are allocated, and then the SF OFDM symbols for each of the selected transmit antennas 116 are transmitted simultaneously. Therefore, at the transmitting device 102 at least, the communications system 101 operates according to a MIMO OFCDM scheme, but with spreading only in the time domain.

In the fourth embodiment of the present invention the chip sequences of the selected receive antennas in the chip matrix Y are passed to separate despreading portions $120_1, 120_2, \ldots 120_3$. Despreading in this manner results in a vector z of symbols, rather than chips, as follows:

$$z=Yc^T$$

where c is the 1×SF spreading vector used by the OFCDM spreading portion 210, the entries in the vector possibly being one of the orthogonal Walsh-Hadamard spreading codes of length SF.

The R symbols in the symbol vector z are then passed to the MIMO detector 216-1 to produce an estimate of the T data symbols in the symbol vector x transmitted from the transmit antennas 116. An example MIMO detector 216-1 is to generate a linear estimator matrix W equal to $H^{-1}$ so that the estimate $\hat{x}$ of the transmit symbol vector is given as:

$$\hat{x}=Wz.$$

Using the MIMO detection scheme of the prior art as described above where the detection is performed on sequences of chips, this effectively means that the MIMO detection function is required to be called SF times, once for each of the SF R-dimensional chip vectors in the received chip matrix Y.

It can readily be seen that performing MIMO detection at symbol level as in the fourth embodiment, after despreading, only requires the MIMO detection function to be called once, rather than SF times as in the prior art. This is apparent by a comparison of the operation $\hat{X}=WY$ required in the prior art with the operation $\hat{x}=Wz$ required in this embodiment of the present invention. In the former, the chip matrix Y being operated on by the linear estimator W is made up of a SF vectors (chip-level detection), whereas in the latter the symbol vector z is made up of only a single vector (symbol-level detection). Thus the number of MIMO detection operations has been reduced by a factor of SF with this embodiment of the present invention; in a typical application SF may be 16, 32, 64 or more, so the decrease in required processing can be significant.

The symbol-level processing scheme according to this embodiment of the present invention will be of increasing benefit as the number of antennas in the system increases. For these larger dimensional systems the antenna processing requirements at the receiving device can quickly become substantial or prohibitive, so a reduction in complexity of SF times will be all the more important.

Another important advantage over the prior art is that, since the MIMO detector 116-1 in this embodiment of the present invention is estimating symbols as opposed to chips, the MIMO detection process is no longer limited to the use of linear estimators as mentioned above in respect of the prior art system. Non-linear detectors such as the optimal A Posteriori Probability (APP) detector could be applied to the symbol vector z in order to obtain a better estimate of $\hat{x}$, and this can lead to an improvement in performance.

Further modifications that are possible to the fourth embodiment are described in the above-referenced co-pending United Kingdom patent application. For example, it will be appreciated that, whilst the linear estimator W in the above-described embodiment serves as an example of a MIMO detector, this operation could (and probably would in practice) be replaced with another MIMO detector. Therefore, instead of the detection process in the fourth embodiment of the present invention being represented by:

$$\hat{x}=Wz$$

in the general case it would be represented by:

$$\hat{x}=f(z)$$

where $\hat{x}$ is now some arbitrary function of z. This function could be a linear estimator such as W, or a successive interference cancellation detector such as the V-BLAST (Bell Labs Layered Space Time) algorithm, or an exhaustive search method such as the Maximum Likelihood (ML) or A Posteriori Probability (APP) detector. With such non-linear MIMO detectors, as mentioned above it is important whether the input is just the received signal (Y), i.e. a matrix of chips, or the despread signal ($Yc^T$), i.e. a vector of symbols. Processing the received signals according to this embodiment of the present invention allows any existing (or future) MIMO detection technique to be employed for OFCDM systems, as the output from the MIMO detection function will be in the form of symbols and not chips.

Embodiments of the invention have been mainly described in the context of a MIMO system with time domain coding but embodiments of the invention have also been described in frequency domain coded systems such as MIMO-OFDM (Orthogonal Frequency Division Multiplexed) systems. For example, an embodiment of the present invention may be employed with the European Hiperlan/2 or US IEEE 802.11 standards for wireless networks. Embodiments of the invention may also be employed in non-wireless applications such as magnetic or optical disk drive read head circuitry where, for example, multiple layers of a disk in effect act as multiple transmitters, one or more heads receiving read data influenced by "transmitted" signals from more than one layer.

It will be appreciated that operation of one or both of the transmitting device 202 and receiving device 214 can be controlled by a program operating on the device. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

The invention claimed is:

1. A communications method for use in a communications system including a transmitting device having a plurality of transmit antennas and a receiving device having a plurality of receive antennas, the method comprising:
    determining that an error has occurred in a first data transmission attempt in which data signals are transmitted from a first selection of transmit antennas for receipt at a second selection of receive antennas;
    in response to such a determination performing a second data transmission attempt in which the data signals are re-transmitted from a third selection of transmit antennas for receipt at a fourth selection of receive antennas, performing a reconfiguration operation to ensure that the channel response between the transmit and receive antennas selected for the first transmission attempt is different to the channel response between the transmit and receive antennas selected for the second transmission attempt; and
    recovering data at the receiving device using information from the first and second transmission attempts;
    wherein at least one of the second, third, and fourth selections is made based on an actual or estimated channel response between the transmit and receive antennas for a transmission attempt.

2. A communications method as claimed in claim 1, wherein the reconfiguration operation comprises making the first selection different from the third selection.

3. A communications method as claimed in claim 2, wherein the transmission attempts is the first transmission attempt.

4. A communications method as claimed in claim 2, wherein at least one of the third and fourth selections is made based on an actual or estimated channel response between the transmit and receive antennas for the second transmission attempt.

5. A communications method as claimed in claim 1, wherein the reconfiguration operation comprises making the second selection different from the fourth selection.

6. A communications method as claimed in claim 1, wherein the reconfiguration operation comprises ensuring that at least one transmission characteristic of at least one antenna common to the first and third selections is different for the first and second transmission attempts.

7. A communications method as claimed in claim 6, wherein the at least one transmission characteristic comprises the transmission mode of the antenna(s).

8. A communications method as claimed in claim 6, wherein the at least one transmission/reception characteristic is altered by use of a physical structure in the vicinity of the antenna(s).

9. A communications method as claimed in claim 1, wherein the transmission error in the first attempt is notified to the transmitting device by sending a Negative Acknowledgement, NACK, packet from the receiving device to the transmitting device.

10. A communications method as claimed in claim 1, wherein the reconfiguration operation comprises ensuring that a reception characteristic of at least one antenna common to both the second and fourth selections is different for the first and second transmission attempts.

11. A communications method as claimed in claim 10, wherein the at least one transmission/reception characteristic is altered by use of a physical structure in the vicinity of the antenna(s).

12. A communications method as claimed in claim 1, comprising, for a particular transmission attempt:
   spreading each of nT symbols in the time domain only to produce nT time sequences of chips;
   transmitting the nT time sequences of chips from the nT transmit antennas respectively of the transmitting device in the selection of transmit antennas for that transmission attempt;
   despreading each of nR time sequences of chips received from the transmitting device at the nR receive antennas respectively of the receiving device in the selection of receive antennas for that transmission attempt to produce nR received symbols; and
   processing the nR received symbols to produce an estimate of the nT symbols spread at the transmitting device.

13. A communications method as claimed in claim 1, wherein the reconfiguration operation comprises employing a channel scrambler at the transmitting device to scramble signals before transmission from the selected transmit antennas in at least one of the first and second transmission attempts to produce a different effective channel response.

14. A communications method as claimed in claim 1, wherein the first and third selections each comprise between one and all of the available transmit antennas.

15. A communications method as claimed in claim 1, wherein the second and fourth selections each comprise between one and all of the available receive antennas.

16. A communications method as claimed in claim 1, wherein the number of antennas in the first and third selections is the same.

17. A communications method as claimed in claim 16, wherein the antennas in the first and third selections are the same.

18. A communications method as claimed in claim 1, wherein the number of antennas in the second and fourth selections is the same.

19. A communications method as claimed in claim 18, wherein the antennas in the second and fourth selections are the same.

20. A communications method as claimed in claim 1, wherein the communications system is a Multiple Input Multiple Output system.

21. A communications method as claimed in claim 1, wherein the data signals are modulated onto one or more sub-carriers prior to transmission.

22. A communications method as claimed in claim 21, wherein the one or more sub-carriers are sub-carriers in an Orthogonal Frequency Division Multiplexing scheme.

23. A communications method as claimed in claim 1, wherein the data signals are spread prior to transmission with a user-specific spreading code, with each user of the communications system being allocated a different spreading code.

24. A communications method as claimed in claim 23, wherein the spreading codes allocated to each user are orthogonal spreading codes.

25. A communications method as claimed in claim 23, wherein spreading is performed according to the Orthogonal Frequency Code Division Multiplexing scheme.

26. A communications method as claimed in claim 1, wherein data is recovered at the receiving device by detecting and decoding based on the signals received from the second transmission attempt, with the aid of a-priori information obtained during the detection and decoding of the first transmission attempt.

27. A communications method as claimed in claim 26, wherein the a-priori information is soft log-likelihood information.

28. A communications method as claimed in claim 1, wherein data is recovered at the receiving device by detecting and decoding based on an aggregate of at least some signals received from the first transmission attempt with at least some signals received from the second transmission attempt.

29. A communications method as claimed in claim 28, wherein the aggregate comprises all of the signals received from the first and second transmission attempts.

30. A communications method as claimed in claim 28, wherein the aggregate comprises a selection of signals received from the first and second transmission attempts.

31. A communications method as claimed in claim 30, wherein at least part of the selection is chosen at random.

32. A communications method as claimed in claim 30, wherein at least part of the selection is chosen based on the channel response.

33. A communications method as claimed in claim 31, wherein at least part of the selection is chosen based on the channel response.

34. A communications system comprising:
   a transmitting device having a plurality of transmit antennas;
   a receiving device having a plurality of receive antennas;
   means for determining that an error has occurred in a first data transmission attempt in which data signals are transmitted from a first selection of transmit antennas for receipt at a second selection of receive antennas;
   means for performing, in response to such a determination, a second data transmission attempt in which the data signals are re-transmitted from a third selection of transmit antennas for receipt at a fourth selection of receive antennas;
   means for performing a reconfiguration operation to ensure that the channel response between the transmit and receive antennas selected for the first transmission attempt is different to the channel response between the transmit and receive antennas selected for the second transmission attempt;
   means for recovering data at the receiving device using information from the first and second transmission attempts; and
   means for determining an actual or estimated channel response between the transmit and receive antennas for a transmission attempt on which to base at least one of the second, third, and fourth selections.

35. A communications method for use by a transmitting device having a plurality of transmit antennas in a communications system including a receiving device having a plurality of receive antennas, the method comprising:
   determining that an error has occurred in a first data transmission attempt in which data signals are transmitted from a first selection of transmit antennas for receipt at a second selection of receive antennas;
   in response to such a determination performing a second data transmission attempt in which the data signals are re-transmitted from a third selection of transmit antennas for receipt at a fourth selection of receive antennas;
   performing a reconfiguration operation to ensure that the channel response between the transmit and receive antennas selected for the first transmission attempt is different to the channel response between the transmit and receive antennas selected for the second transmission attempt, such that data can be recovered at the receiving device using information from the first and second transmission attempts; and wherein at least one of the second, third, and fourth selections is made based on an actual or estimated channel response between the transmit and receive antennas for a transmission attempt.

36. A computer readable medium incorporating computer readable code for controlling a communications device, to carry out a method as claimed in claim 35.

37. A communications device having a plurality of transmit antennas for use in a communications system including a receiving device having a plurality of receive antennas, the communications device further comprising:
   means for determining that an error has occurred in a first data transmission attempt in which data signals are transmitted from a first selection of transmit antennas for receipt at a second selection of receive antennas;
   means for performing, in response to such a determination, a second data transmission attempt in which the data signals are re-transmitted from a third selection of transmit antennas for receipt at a fourth selection of receive antennas;
   means for performing a reconfiguration operation to ensure that the channel response between the transmit and receive antennas selected for the first transmission attempt is different to the channel response between the transmit and receive antennas selected for the second transmission attempt, such that data can be recovered at the receiving device using information from the first and second transmission attempts; and
   means for determining an actual or estimated channel response between the transmit and receive antennas for a transmission attempt on which to base at least one of the second, third, and fourth selections.

38. A computer readable medium incorporating computer readable code for controlling a communications device, causing the device to function as the communications device as claimed in claim 37.

39. A communications method for use by a receiving device having a plurality of receive antennas in a communications system including a transmitting device having a plurality of transmit antennas, the method comprising:
   determining that an error has occurred in a first data transmission attempt in which data signals are transmitted from a first selection of transmit antennas for receipt at a second selection of receive antennas;
   in response to such a determination performing a second data transmission attempt in which the data signals are re-transmitted from a third selection of transmit antennas for receipt at a fourth selection of receive antennas;
   performing a reconfiguration operation to ensure that the channel response between the transmit and receive antennas selected for the first transmission attempt is different to the channel response between the transmit and receive antennas selected for the second transmission attempt, and recovering data at the receiving device using information from the first and second transmission attempts; and
   wherein at least one of the second, third, and fourth selections is made based on an actual or estimated channel response between the transmit and receive antennas for a transmission attempt.

40. A computer readable medium incorporating computer readable code for controlling a communications device, to carry out a method as claimed in claim 39.

41. A communications device having a plurality of receive antennas for use in a communications system including a transmitting device having a plurality of transmit antennas, the communications device comprising:
   means for determining that an error has occurred in a first data transmission attempt in which data signals are transmitted from a first selection of transmit antennas for receipt at a second selection of receive antennas;
   means for performing, in response to such a determination, a second data transmission attempt in which the data signals are retransmitted from a third selection of transmit antennas for receipt at a fourth selection of receive antennas;
   means for performing a reconfiguration operation to ensure that the channel response between the transmit and receive antennas selected for the first transmission attempt is different to the channel response between the transmit and receive antennas selected for the second transmission attempt;
   means for recovering data using information from the first and second transmission attempts; and
   means for determining an actual or estimated channel response between the transmit and receive antennas for a transmission attempt on which to base at least one of the second, third, and fourth selections.

42. A computer readable medium incorporating computer readable code for controlling a communications device, to function as the communications device as claimed in claim 41.

* * * * *